United States Patent
Spangler

(10) Patent No.: US 10,815,794 B2
(45) Date of Patent: Oct. 27, 2020

(54) BAFFLE FOR COMPONENTS OF GAS TURBINE ENGINES

(71) Applicant: United Technologies Corporation, Farmington, CT (US)

(72) Inventor: Brandon W. Spangler, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 84 days.

(21) Appl. No.: 16/210,146

(22) Filed: Dec. 5, 2018

(65) Prior Publication Data

US 2020/0182072 A1   Jun. 11, 2020

(51) Int. Cl.
*F01D 5/18* (2006.01)
*F01D 9/04* (2006.01)

(52) U.S. Cl.
CPC ............. *F01D 5/189* (2013.01); *F01D 5/186* (2013.01); *F01D 9/041* (2013.01); *F05D 2240/126* (2013.01); *F05D 2260/201* (2013.01); *F05D 2260/202* (2013.01)

(58) Field of Classification Search
CPC .......... F01D 5/189; F01D 5/186; F01D 9/041; F05D 2240/126; F05D 2260/201; F05D 2260/202
See application file for complete search history.

(56) References Cited

U.S. PATENT DOCUMENTS

| | | | |
|---|---|---|---|
| 3,767,322 A | 10/1973 | Durgin et al. | |
| 4,297,077 A * | 10/1981 | Durgin | F01D 5/189 |
| | | | 416/97 R |
| 4,482,295 A * | 11/1984 | North | F01D 5/189 |
| | | | 415/115 |
| 5,120,192 A | 6/1992 | Ohtomo et al. | |
| 5,259,730 A | 11/1993 | Damlis et al. | |
| 5,328,331 A * | 7/1994 | Bunker | F01D 5/187 |
| | | | 415/115 |
| 9,537,470 B2 | 1/2017 | Kim et al. | |
| 10,012,092 B2 | 7/2018 | Mongillo et al. | |
| 2015/0016973 A1* | 1/2015 | Mugglestone | F01D 5/187 |
| | | | 415/175 |
| 2016/0102563 A1* | 4/2016 | Spangler | F01D 9/041 |
| | | | 415/115 |
| 2017/0044906 A1* | 2/2017 | Mongillo | F01D 25/12 |
| 2017/0044907 A1* | 2/2017 | Spangler | F01D 9/041 |

FOREIGN PATENT DOCUMENTS

| | | |
|---|---|---|
| EP | 1380724 A2 | 1/2004 |
| EP | 3333367 A1 | 6/2018 |
| WO | 2013101761 A1 | 7/2013 |

OTHER PUBLICATIONS

European Search Report for European Application No. 19212640.7, International Filing Date Nov. 29, 2019, dated Apr. 23, 2020, 7 pages.

* cited by examiner

*Primary Examiner* — Nathaniel E Wiehe
*Assistant Examiner* — Eric A Lange
(74) *Attorney, Agent, or Firm* — Cantor Colburn LLP

(57) ABSTRACT

Baffles for gas turbine engines are provided. The baffles include a baffle body extending between a first end and a second end, a chamfered surface formed at at least one corner of the baffle body, wherein the chamfered surface extends from the first end to the second end, and a plurality of baffle holes formed in the chamfered surface.

20 Claims, 9 Drawing Sheets

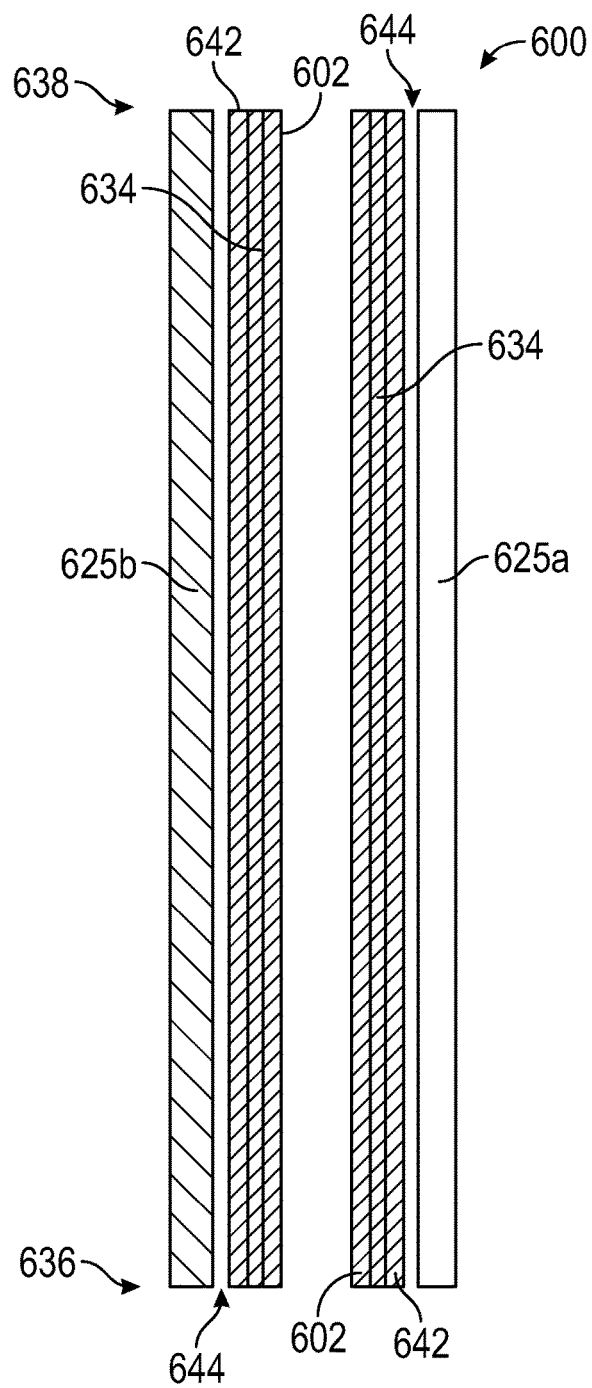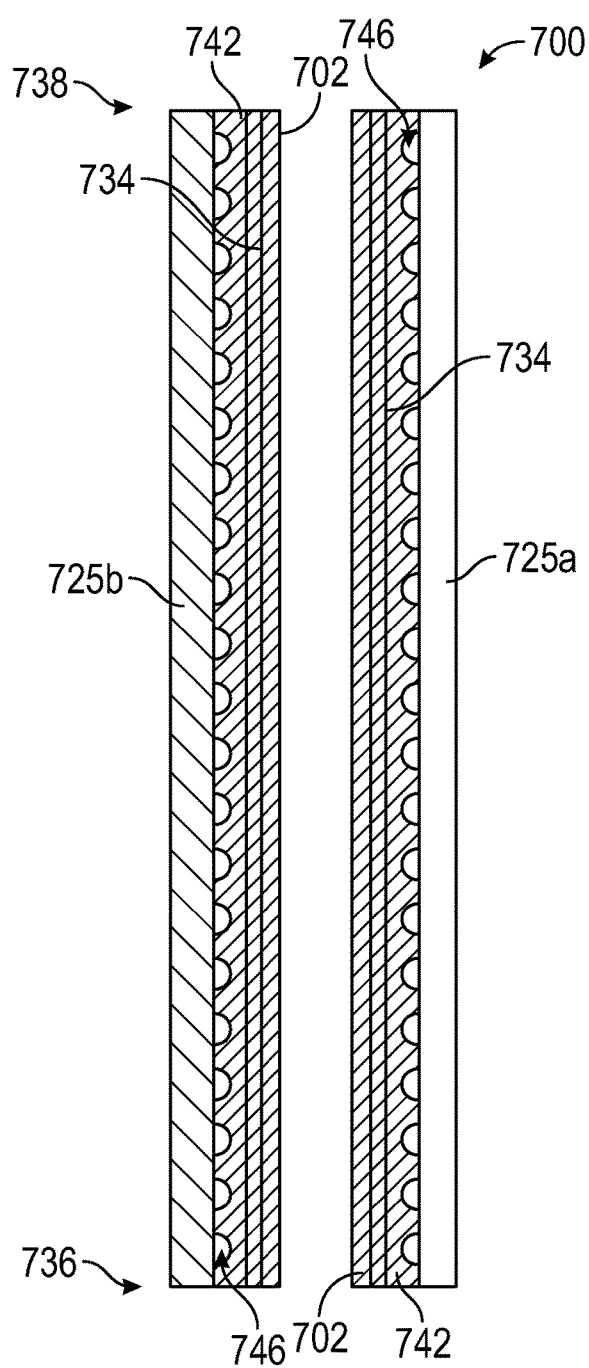

BAFFLE FOR COMPONENTS OF GAS TURBINE ENGINES

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Such cooling cavities are subject to both hot material walls (exterior or external) and cold material walls (interior or internal). Although such cavities are designed for cooling portions of airfoil bodies, various cooling flow characteristics can cause hot sections where cooling may not be sufficient. Accordingly, improved means for providing cooling within an airfoil may be desirable.

BRIEF DESCRIPTION

According to some embodiments, baffles for gas turbine engines are provided. The baffles include a baffle body extending between a first end and a second end, a chamfered surface formed at at least one corner of the baffle body, wherein the chamfered surface extends from the first end to the second end, and a plurality of baffle holes formed in the chamfered surface.

In addition to one or more of the features described herein, or as an alternative, further embodiments may include a second chamfered surface formed at a different corner of the baffle body, wherein the chamfered surface extends from the first end to the second end, and a plurality of second baffle holes are formed in the second chamfered surface.

In addition to one or more of the features described herein, or as an alternative, further embodiments may include a blocking extension extending from the baffle body and located proximate the chamfered surface.

In addition to one or more of the features described herein, or as an alternative, further embodiments may include that the blocking extension extends from the first end to the second end.

In addition to one or more of the features described herein, or as an alternative, further embodiments may include that the blocking extension comprises a plurality of blocking extension notches.

According to some embodiments, components for gas turbine engines are provided. The components include an airfoil having a leading edge, a trailing edge, a suction side, and a pressure side, wherein an airfoil cavity is formed within the airfoil, wherein the airfoil extends from an inner diameter to an outer diameter and a baffle installed within the airfoil cavity. The baffle includes a baffle body having a first end and a second end, wherein the first end is located proximate the inner diameter and the second end is located proximate the outer diameter, a chamfered surface formed at at least one corner of the baffle body, wherein the chamfered surface extends from the first end to the second end, and a plurality of baffle holes formed in the chamfered surface.

In addition to one or more of the features described herein, or as an alternative, further embodiments may include that the airfoil cavity is a mid-cavity of the airfoil.

In addition to one or more of the features described herein, or as an alternative, further embodiments may include a leading edge cavity and a trailing edge cavity formed within the airfoil.

In addition to one or more of the features described herein, or as an alternative, further embodiments may include a second baffle installed within the leading edge cavity.

In addition to one or more of the features described herein, or as an alternative, further embodiments may include that the second baffle comprises a chamfered surface formed at at least one corner of the second baffle, wherein the chamfered surface of the second baffle extends from a first end to a second end of the second baffle and a plurality of baffle holes are formed in the chamfered surface of the second baffle.

In addition to one or more of the features described herein, or as an alternative, further embodiments may include that the mid-cavity is fluidly connected to the trailing edge cavity.

In addition to one or more of the features described herein, or as an alternative, further embodiments may include that the airfoil comprises a rib separating the airfoil cavity from at least one additional airfoil cavity.

In addition to one or more of the features described herein, or as an alternative, further embodiments may include that the chamfered surface is positioned adjacent the rib.

In addition to one or more of the features described herein, or as an alternative, further embodiments may include a blocking extension extending from the baffle body and located proximate the chamfered surface.

In addition to one or more of the features described herein, or as an alternative, further embodiments may include that the blocking extension extends from the first end to the second end.

In addition to one or more of the features described herein, or as an alternative, further embodiments may include that the blocking extension extends from the baffle body toward a sidewall of the airfoil but does not contact the sidewall and defines a blocking extension gap between the blocking extension and the sidewall.

In addition to one or more of the features described herein, or as an alternative, further embodiments may include that the blocking extension comprises a plurality of blocking extension notches.

In addition to one or more of the features described herein, or as an alternative, further embodiments may include that the blocking extension contacts a sidewall of the airfoil and the blocking extension notches define flow paths through the blocking extension.

In addition to one or more of the features described herein, or as an alternative, further embodiments may include a second chamfered surface formed at a different corner of the baffle body, wherein the chamfered surface extends from the first end to the second end, and a plurality of second baffle holes are formed in the second chamfered surface.

According to some embodiments, gas turbine engines are provided. The gas turbine engines include an airfoil having a leading edge, a trailing edge, a suction side, and a pressure side, wherein an airfoil cavity is formed within the airfoil, wherein the airfoil extends from an inner diameter to an outer diameter and a baffle installed within the airfoil cavity. The baffle includes a baffle body having a first end and a second end, wherein the first end is located proximate the inner diameter and the second end is located proximate the outer diameter, a chamfered surface formed at at least one corner of the baffle body, wherein the chamfered surface extends from the first end to the second end, and a plurality of baffle holes formed in the chamfered surface.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

FIG. 6 is a schematic illustration of an airfoil in accordance with an embodiment of the present disclosure;

FIG. 7 is a schematic illustration of an airfoil in accordance with an embodiment of the present disclosure.

DETAILED DESCRIPTION

Detailed descriptions of one or more embodiments of the disclosed apparatus and/or methods are presented herein by way of exemplification and not limitation with reference to the Figures.

Figure 1:
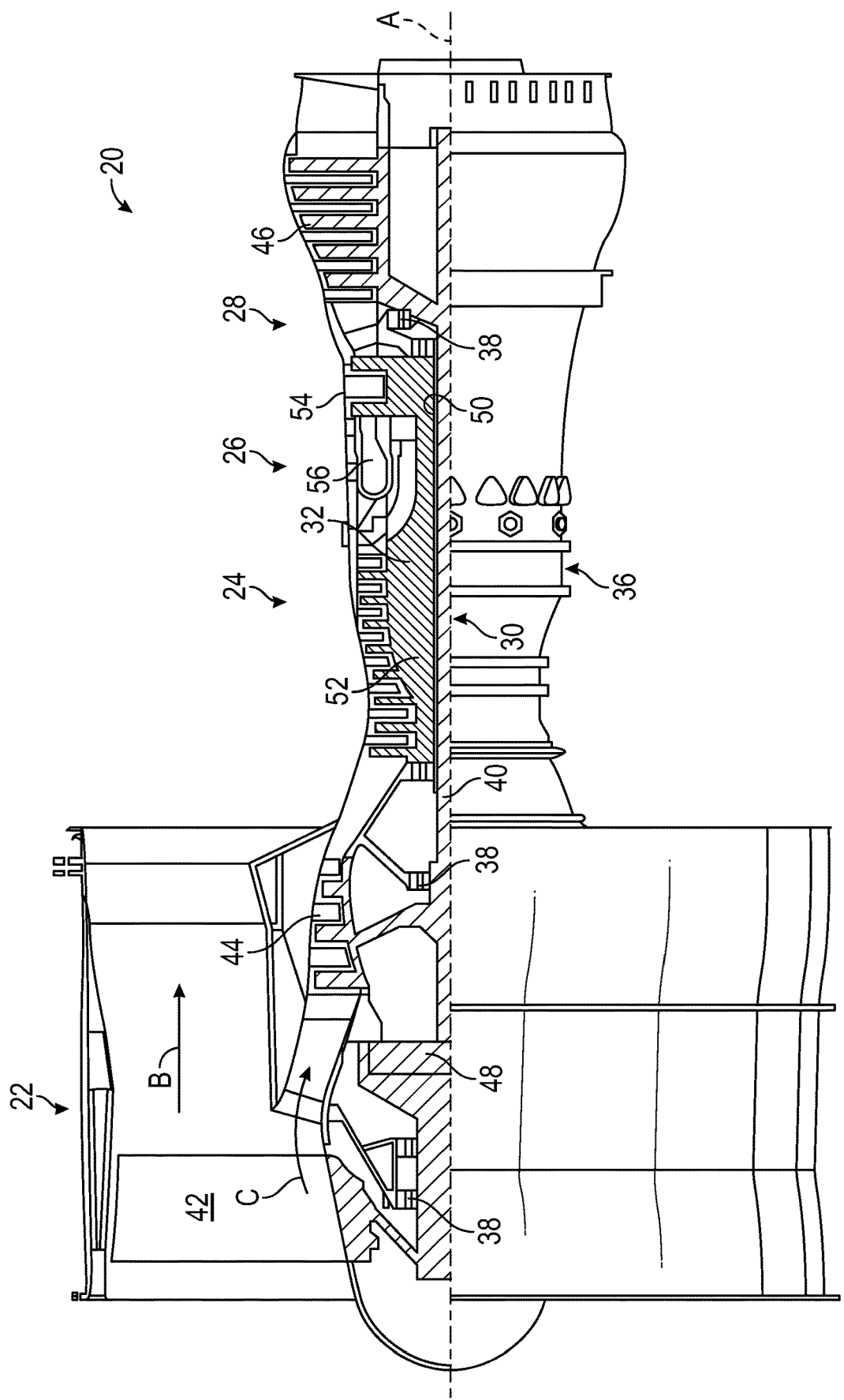
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one non-limiting example is a high-bypass geared aircraft engine. In a further non-limiting example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(514.7°R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
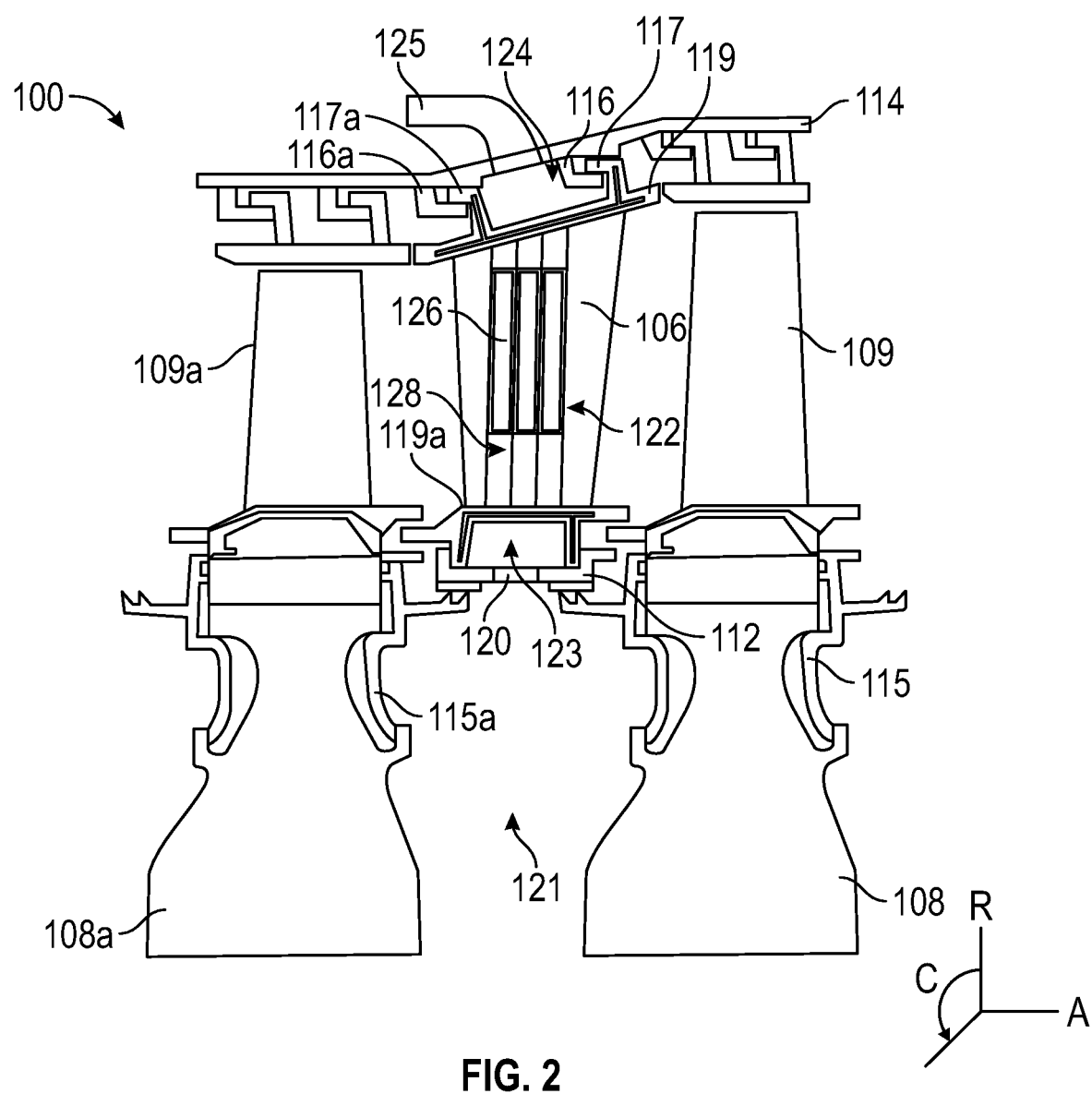
FIG. 2 is a schematic illustration of a portion of a turbine section of the gas turbine engine of FIG. 1.

Referring now to FIG. 2, a cooling design in a turbine section 28 for a gas turbine engine 20 may utilize a vane 106 disposed between axially adjacent bladed full hoop disks 108, 108a having respective blades 109, 109a. As shown, vane 106 is disposed radially between an inner air seal 112 and a full hoop case 114 on an outer side. Inner air seal 112 may be a full hoop structure supported by opposing vanes, including a plurality of vanes 106 that are separated in a circumferential direction. Vane 106 is supported by the full hoop case 114 through segmented vane hooks 117, 117a. One or more full hoop cover plates 115, 115a may minimize leakage between the vane 106 and the blades 109, 109a. The vane 106 is radially supported by the full hoop case 114 with segmented case hooks 116, 116a in mechanical connection with the segmented vane hooks 117, 117a. The vane 106 may be circumferentially supported between circumferentially adjacent platforms 119, 119a which may include feather seals that can minimize leakage between the adjacent vanes 106 into the gas path.

Although FIG. 2 depicts a second stage vane, as appreciated by those of skill in the art, embodiments provided herein can be applicable to first stage vanes as well. Such first stage vanes may have cooling flow supplied to the vane at both the inner and outer diameters, as opposed to the through-flow style cavity which goes from, for example, outer diameter to inner diameter. Thus, the present illustrations are not to be limiting but are rather provided for illustrative and explanatory purposes only.

In the present illustration, a turbine cooling air (TCA) conduit 125 provides cooling air into an outer diameter vane cavity 124 defined in part by an outer platform 119 and the full hoop case 114. The vane 106 is hollow so that air can travel radially into and longitudinally downstream from the outer diameter vane cavity 124, through the vane 106 via one or more vane cavities 122, and into a vane inner diameter cavity 123. The vane inner diameter cavity 123 is defined, in part, by an inner platform 119a. Thereafter air may travel through an orifice 120 in the inner air seal 112 and into a rotor cavity 121. Accordingly, cooling air for at least portions of the vane 106 will flow from a platform region, into the vane, and then out of the vane and into another platform region and/or into a hot gaspath/main gaspath. In some arrangements, the platforms 119, 119a can include ejection holes to enable some or all of the air to be injected into the main gaspath.

It is to be appreciated that the longitudinal orientation of vane 106 is illustrated in a radial direction, but other orientations for vane 106 are within the scope of the disclosure. In such alternate vane orientations, fluid such as cooling air can flow into the vane cavity 122 through an upstream opening illustrated herein as outer diameter cavity 124 and out through a downstream opening in vane cavity 122 illustrated herein as inner diameter cavity 123. A longitudinal span of vane cavity 122 being between such openings.

The vane 106, as shown, includes one or more baffles 126 located within the vane 106. The baffles 126 are positioned within one or more respective baffle cavities 128. The baffle cavities 128 are sub-portions or sub-cavities of the vane cavity 122. In some embodiments, such as shown in FIG. 2, the baffle cavities 128 are internal cavities that are axially inward from the leading and trailing edges of the vane 106, although such arrangement is not to be limiting. The TCA conduit 125 may provide cooling air that can flow into the baffles 126 and then impinge from the respective baffle 126 onto an interior surface of the vane 106.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

Figure 3A:
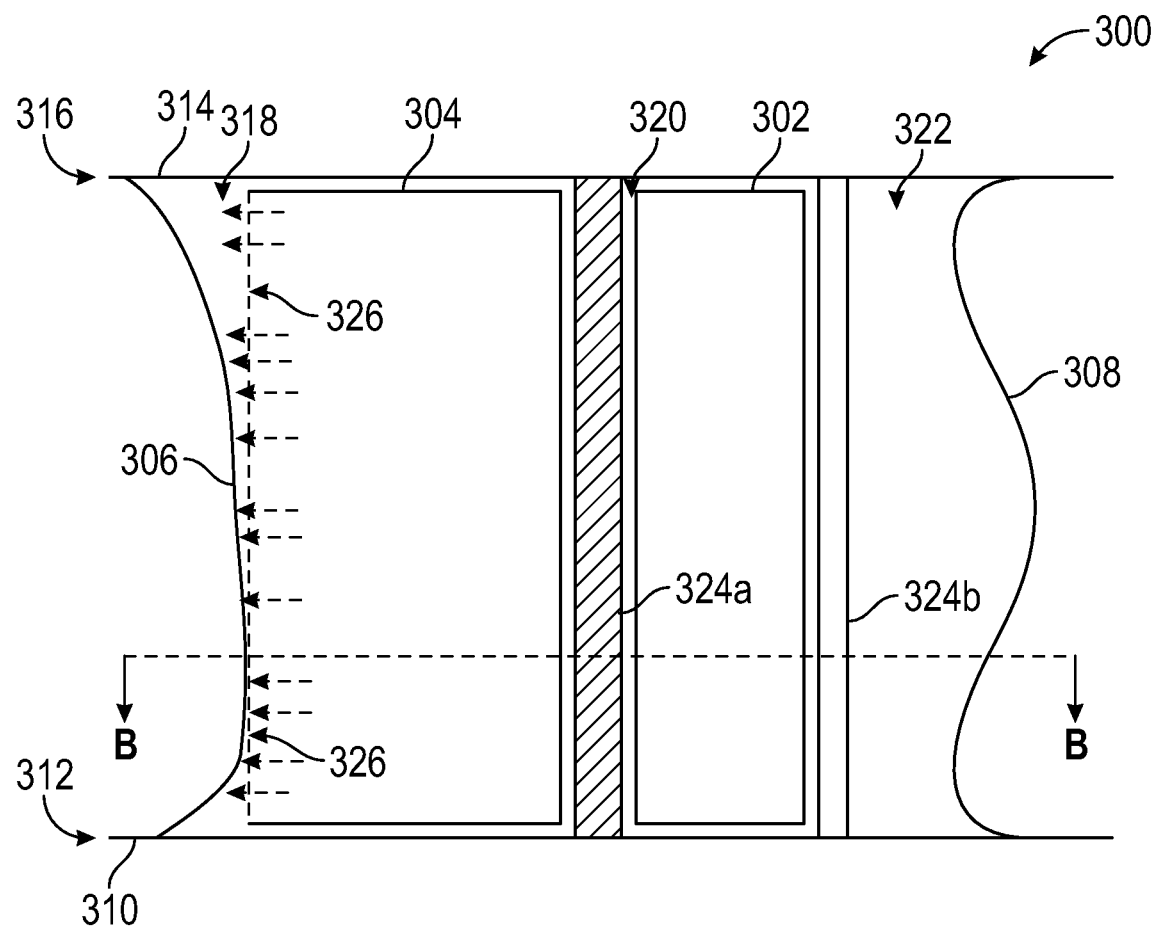
FIG. 3A is an elevation schematic illustration of an airfoil.
Figure 3B:
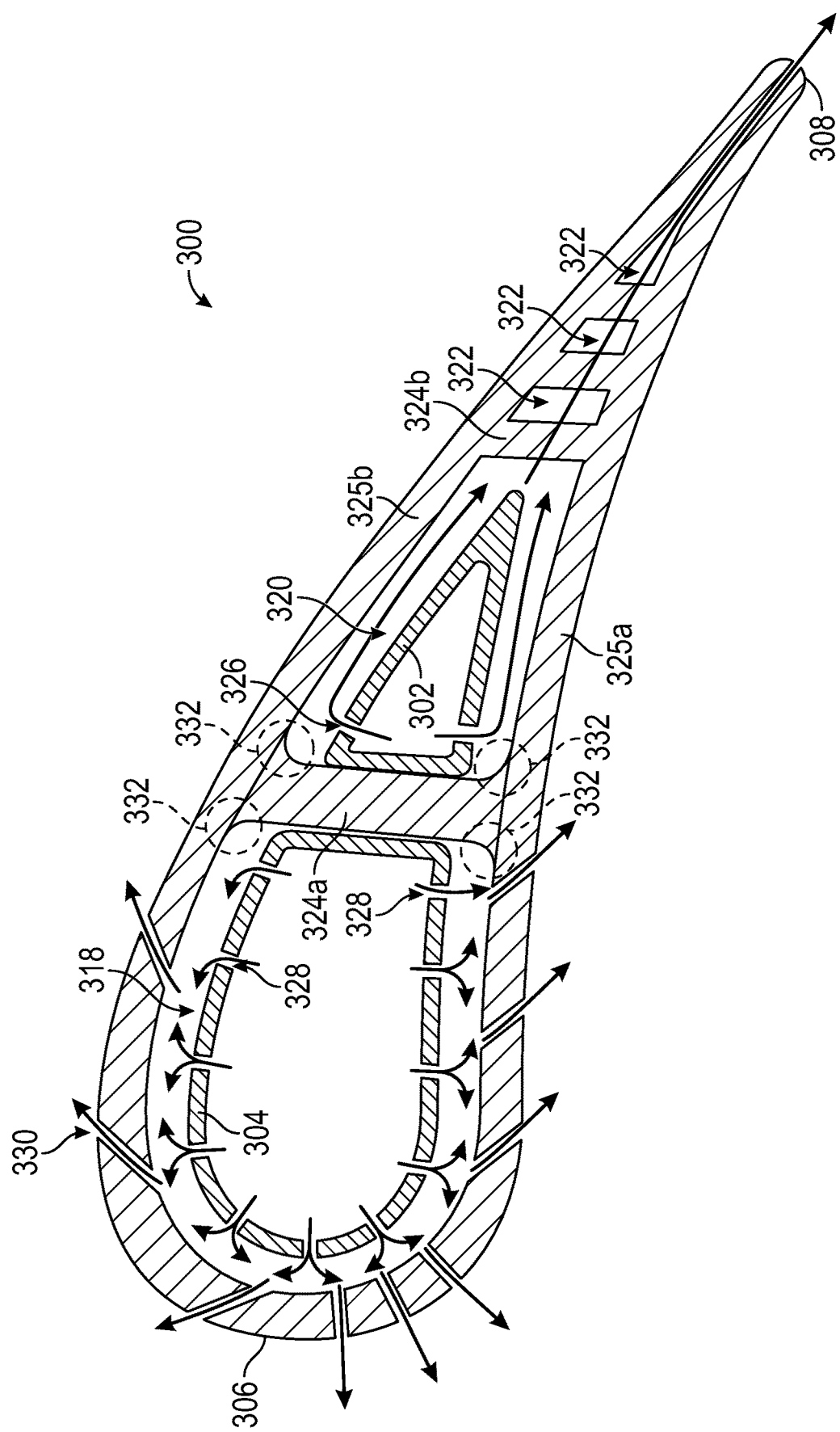
FIG. 3B is a cross-sectional illustration of the airfoil of FIG. 3A as viewed along the line B-B.

Turning now to FIGS. 3A-3B, schematic illustrations of an airfoil 300 having a first baffle 302 and a second baffle 304 installed therein are shown. Each baffle 302, 304 has a baffle body that defines the structure and shape of the respective baffle 302, 304. The airfoil 300 extends in an axial direction between a leading edge 306 and a trailing edge 308. In a radial direction, the airfoil 300 extends between an inner platform 310 at an inner diameter 312 and an outer platform 314 at an outer diameter 316. In this illustrative embodiment, the airfoil 300 has three internal cavities: a leading edge cavity 318, a mid-cavity 320, and a trailing edge cavity 322. Although shown with a specific cavity configuration, those of skill in the art will appreciate that airfoils can have a variety of internal cavity configurations and implement embodiment of the present disclosure. Thus, the present illustration is merely for explanatory purposes and is not to be limiting. FIG. 3A is a side elevation illustration of the airfoil 300 illustrating an internal structure thereof. FIG. 3B is a cross-sectional illustration as viewed along the line B-B.

The cavities 318, 320, 322 may be separated by ribs 324a, 324b, with fluid connections therebetween in some embodiments. The ribs 324a, 324b extend radially between the inner platform 310 at the inner diameter 312 to the outer platform 314 at the outer diameter 316. A first rib 324a may separate the mid-cavity 320 from the leading edge cavity 318, and may, in some embodiments, fluidly separate the two cavities 318, 320. A second rib 324b may separate the mid-cavity 320 from the trailing edge cavity 322, and may, in some embodiments, having through holes to fluidly connect the mid-cavity 320 to the trailing edge cavity 322.

In this embodiment, the leading edge cavity 318 includes the second baffle 304 installed therein and the mid-cavity 320 includes the first baffle 302 therein. The first baffle 302 includes first baffle holes 326 (shown in FIG. 3B) to supply cooling air from within the first baffle 302 into the mid-cavity 320. The cooling air within the mid-cavity 320 may flow into the trailing edge cavity 322 and subsequently exit the airfoil 300 as known in the art. The second baffle 304 includes second baffle holes 328 where cooling air within the second baffle 304 may impinge upon surfaces of the airfoil 300 of the leading edge cavity 318. The cooling or impinged air may then exit the leading edge cavity 318 through film cooling holes 330, as will be appreciated by those of skill in the art.

Due to the construction and geometry of the baffles 302, 304, it is difficult to form (e.g., drill) impingement and cooling supply holes at the edges of the baffles 302, 304 due to the sharpness of edge and positional tolerance of the hole installation process. Due to this, the impingement and cooling supply holes (e.g., baffle holes 326, 328) are installed on a somewhat flat surface away from the edge of the respective baffle 302, 304. When the cooling flow exiting the baffle holes 326, 328 is drawn away from the edge of the respective baffle 302, 304, a region 332 of the airfoil 300 adjacent the edge/corner of the respective baffle 302, 304 has low internal heat transfer, resulting in hotter metal temps in this region. The regions 332 with low internal heat transfer are regions of corners or locations at a junction or joining of the rib 324a between the mid-cavity 320 and the leading edge cavity 318. The regions 332 are defined by the rib 324a and sidewalls 325a, 325b. In this illustration, a first sidewall 325a is a pressure sidewall of the airfoil 300 and a second sidewall 325b is a suction sidewall of the airfoil 300. The regions 332 are formed, in part, because of the flow direction of cooling air when it exits the baffles into the airfoil cavities. For example, as schematically shown in FIG. 3B, cooling air will exit the first baffle 302 and enter into the mid-cavity 320. The cooling air will then be drawn aftward through the mid-cavity 320 and into the trailing edge cavity 322. Because the cooling air is drawn aftward, no cooling air will enter the regions 332 and will not impinge upon the airfoil in the regions 332.

To address, in part, the above regions with low internal heat transfer, embodiments of the present disclosure are directed to baffles having a chamfer at an edge of the baffle to provide a flat surface for baffle holes (e.g., cooling/impingement holes) to be formed on the baffle. The baffle holes formed on the chamfered surface can be directed to aim a cooling flow at the previously low internal heat transfer region. The cooling flow exiting through the baffle holes on the chamfered surface can scrub the corner surface before being drawn away. Further, as described herein, in some embodiments of the present disclosure, blocking extensions can be formed on an exterior surface of the baffle and proximate the chamfered surface. The blocking extensions may extend from the baffle at least partway toward the low internal heat transfer region to further aid in directing the cooling flow toward the low internal heat transfer region before being drawn away.

Figure 4A:
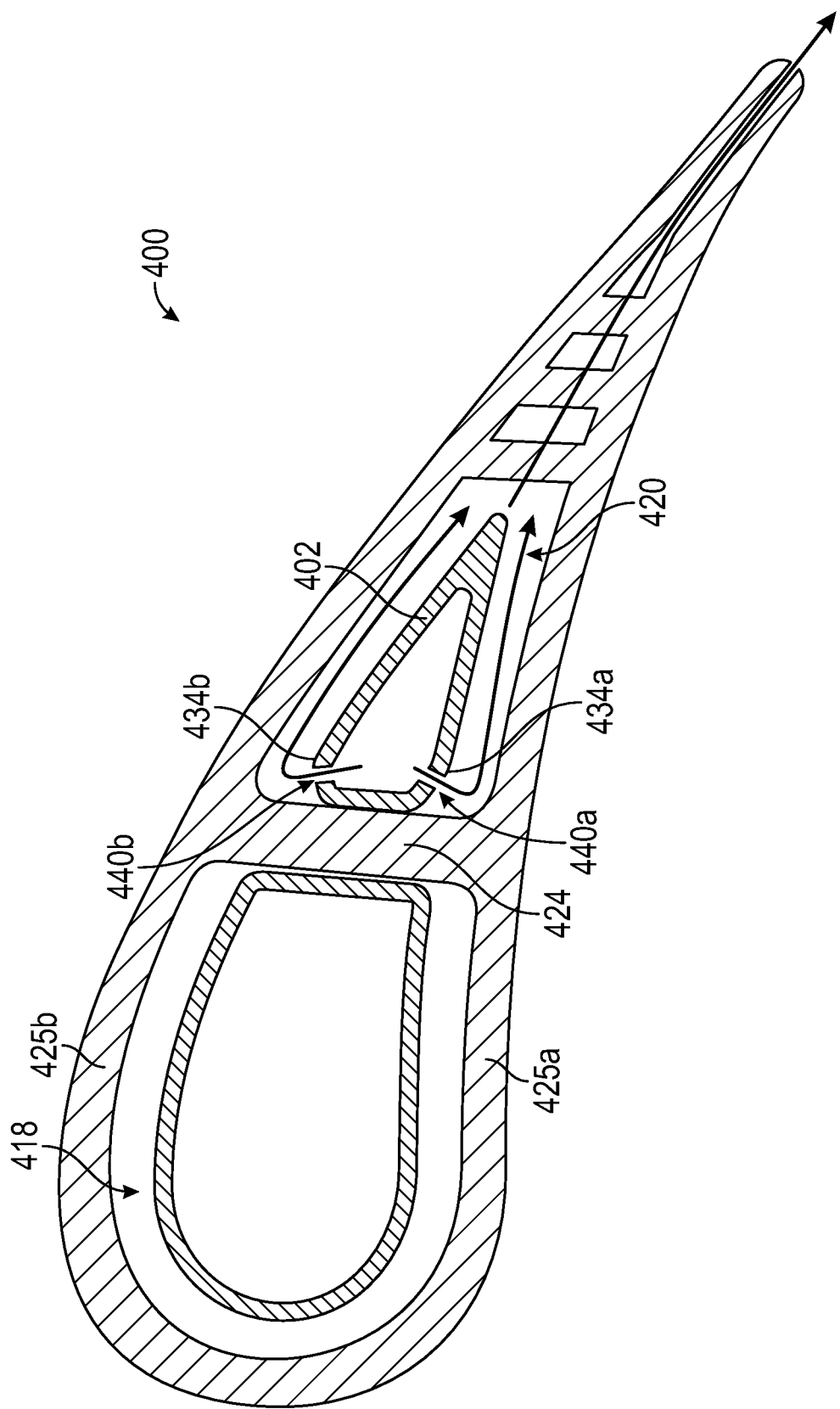
FIG. 4A is a schematic illustration of an airfoil in accordance with an embodiment of the present disclosure, viewed along the ling A-A shown in FIG. 4B.
Figure 4B:
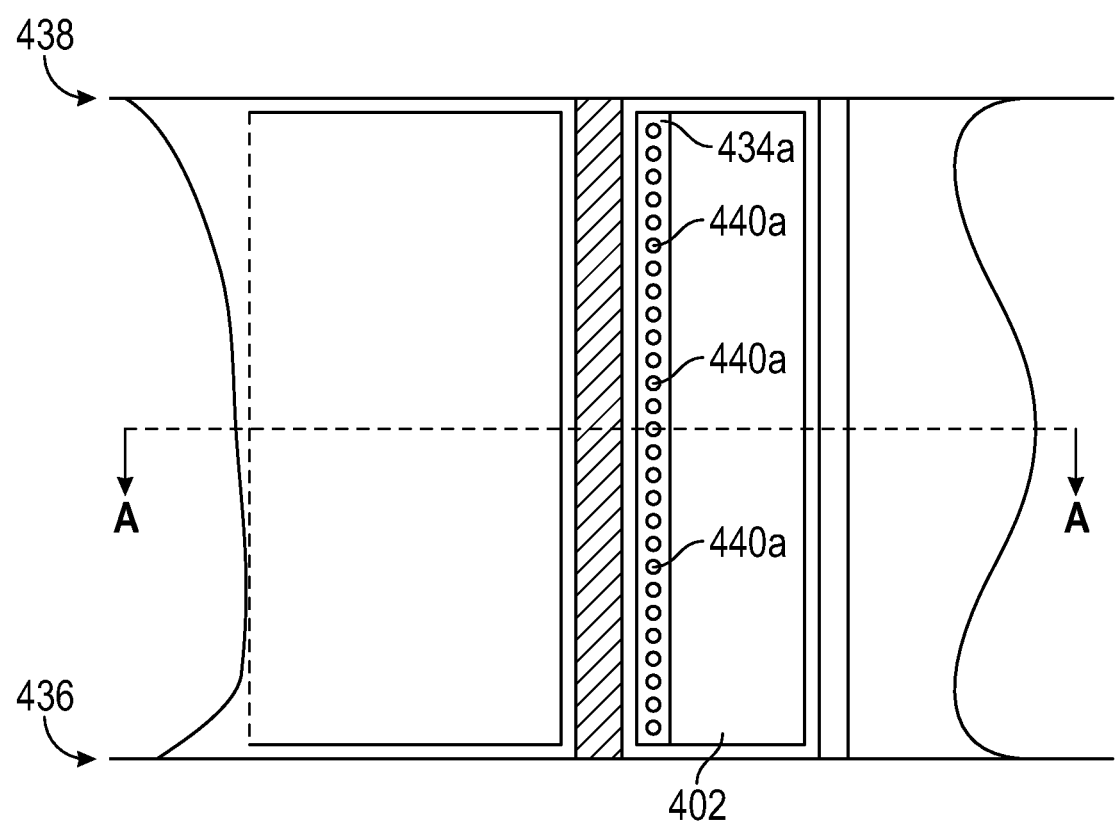
FIG. 4B is a side elevation schematic illustration of the airfoil of FIG. 4A.

Turning now to FIGS. 4A-4B, schematic illustrations of an airfoil 400 in accordance with an embodiment of the present disclosure is shown. FIG. 4A is a cross-sectional illustration of the airfoil 400 as viewed along the line A-A shown in FIG. 4B, and FIG. 4B is a side elevation illustration of the airfoil 400 illustrating an internal structure thereof. The airfoil 400 has a first sidewall 425a and a second sidewall 425b, forming pressure and suction sides of the airfoil 400, as will be appreciated by those of skill in the art.

The airfoil 400 may be substantially similar to that shown in FIGS. 3A-3B, and thus similar aspects may not be labeled or described again for clarity and simplicity. The airfoil 400 includes a mid-cavity 420 with a first baffle 402. The rest of the airfoil 400 is as shown and described above. In this embodiment, the first baffle 402 includes chamfered surfaces 434a, 434b that are configured to be positioned proximate a rib 424 that separates the mid-cavity 420 from a leading edge cavity 418.

The chamfered surfaces 434a, 434b may extend, in some embodiments, from an inner diameter or first end 436 to an outer diameter or second end 438 (e.g., as shown in FIG. 4B). That is, the chamfered surfaces 434a, 434b may be full span surfaces of the first baffle 402. The chamfered surfaces 434a, 434b include baffle holes 440a, 440b on the surfaces thereof, respectively. With the baffle holes 440a, 440b arranged along the chamfered surfaces 434a, 434b, cooling air flowing through the baffle holes 440a, 440b into the mid-cavity 420 will impinge upon the airfoil surfaces at the junction of the rib 424 and the sidewalls 425a, 425b, thus eliminating the prior existing region of low internal heat transfer.

Figure 5:
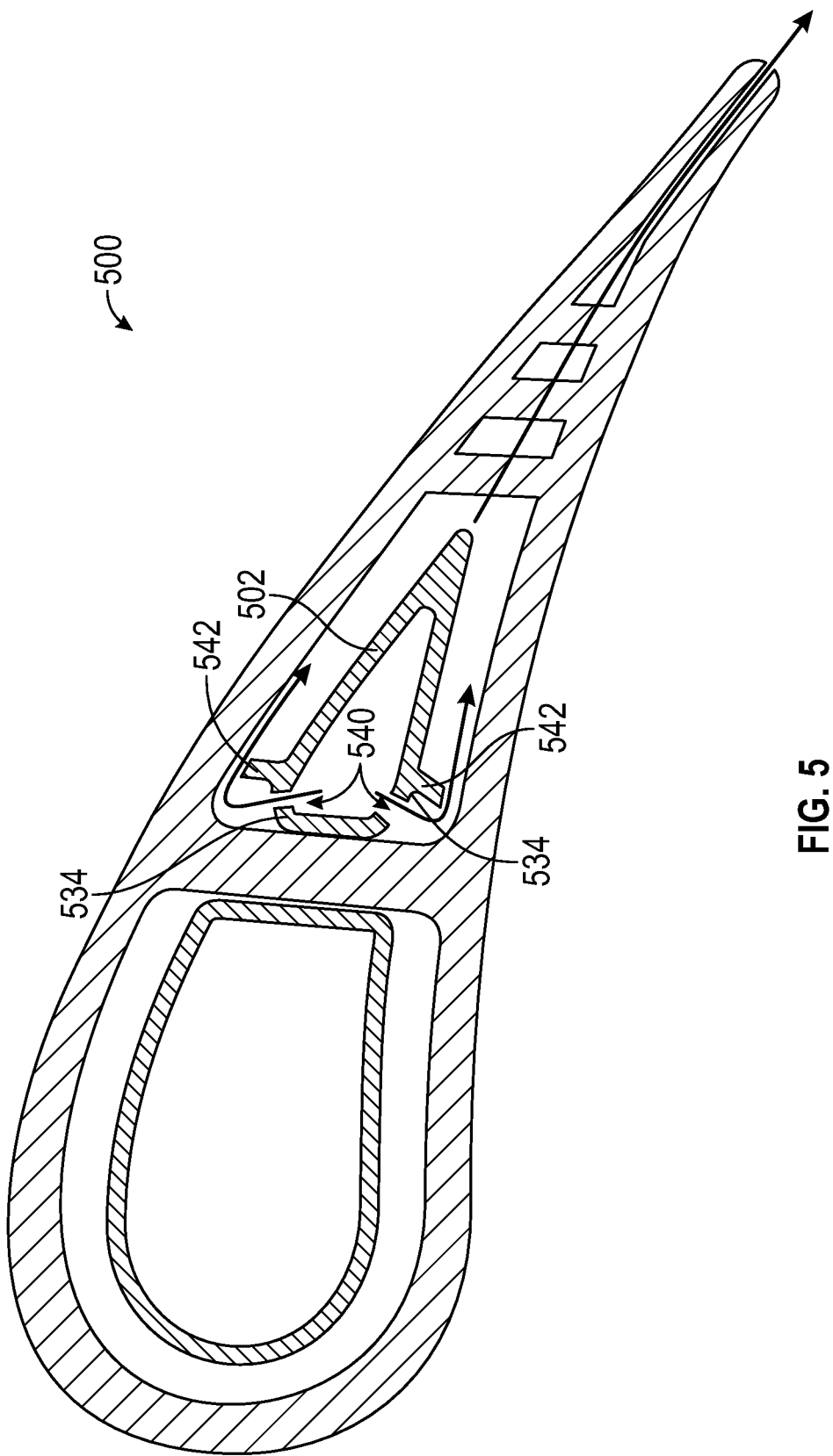
FIG. 5 is a schematic illustration of an airfoil in accordance with an embodiment of the present disclosure.

Turning now to FIG. 5, a schematic illustration of an airfoil 500 having a baffle 502 installed therein in accordance with an embodiment of the present disclosure is shown. The airfoil 500 and baffle 502 may be substantially similar to that shown in FIGS. 4A-4B, and thus like features may not be labeled or described again for clarity and simplicity.

In this embodiment, the baffle 502 includes blocking extensions 542. The blocking extensions 542 are extensions of material of the baffle 502 located proximate and adjacent chamfered surfaces 534 of the baffle 502. The chamfered surfaces 534 include baffle holes 540 to supply cooling air into a region of low internal heat transfer, as described above. The blocking extensions 542 may be full length or full-extend structures that are arranged along the chamfered surfaces 534. For example, the blocking extensions 542 may extend from an inner diameter or first end to an outer diameter or second end (e.g., as shown in FIG. 4B). The blocking extensions 542 are configured to direct flow forward or toward the region of low internal heat transfer, forcing a cooling flow from the baffle holes 540 to contact or scrub the surfaces at the regions of low internal heat transfer (e.g., at the junction of a rib and sidewall of the airfoil 500).

Turning to FIG. 6, a schematic illustration of a baffle 602 arranged within an airfoil 600 in accordance with an embodiment of the present disclosure is shown. As shown, the baffle 602 is arranged between sidewalls 625a, 625b of the airfoil 600. The baffle 602 may have chamfered surfaces 634 as shown and described above, and includes blocking extensions 642. As illustratively shown, the blocking extensions 642 extend between a first end 636 and a second end 638, and thus span a full length of the airfoil 600 when installed therein. Further, as shown, the chamfered surfaces 634 also span a full length of the airfoil 600 between the first end 636 and the second end 638. In this configuration the blocking extensions 642 extend from the baffle 602 but do not contact the sidewalls 625a, 625b, and thus a blocking extension gap 644 is formed between the blocking extensions 642 and the respective sidewalls 625a, 625b. The blocking extension gap 644 enables air entering into a cavity of the airfoil 600 from the baffle 602 to flow aftward after cooling a region of low internal heat transfer.

Turning to FIG. 7, a schematic illustration of a baffle 702 arranged within an airfoil 700 in accordance with an embodiment of the present disclosure is shown. As shown, the baffle 702 is arranged between sidewalls 725a, 725b of the airfoil 700. The baffle 702 may have chamfered surfaces 734 as shown and described above, and includes blocking extensions 742. As illustratively shown, the blocking extensions 742 extend between a first end 736 and a second end 738, and thus span a full length of the airfoil 700 when installed therein. Further, as shown, the chamfered surfaces 734 also span a full length of the airfoil 700 between the first end 736 and the second end 738. In this configuration the blocking extensions 742 extend from the baffle 702 and contact the sidewalls 725a, 725b. However, the blocking extensions 742 are cut away or scalloped (or otherwise shaped/formed) to form blocking extension notches 746 between the blocking extensions 742 and the respective sidewalls 725a, 725b. The blocking extension notches 746 enable air entering into a cavity of the airfoil 700 from the baffle 702 to flow aftward after cooling a region of low internal heat transfer.

Figure 8:
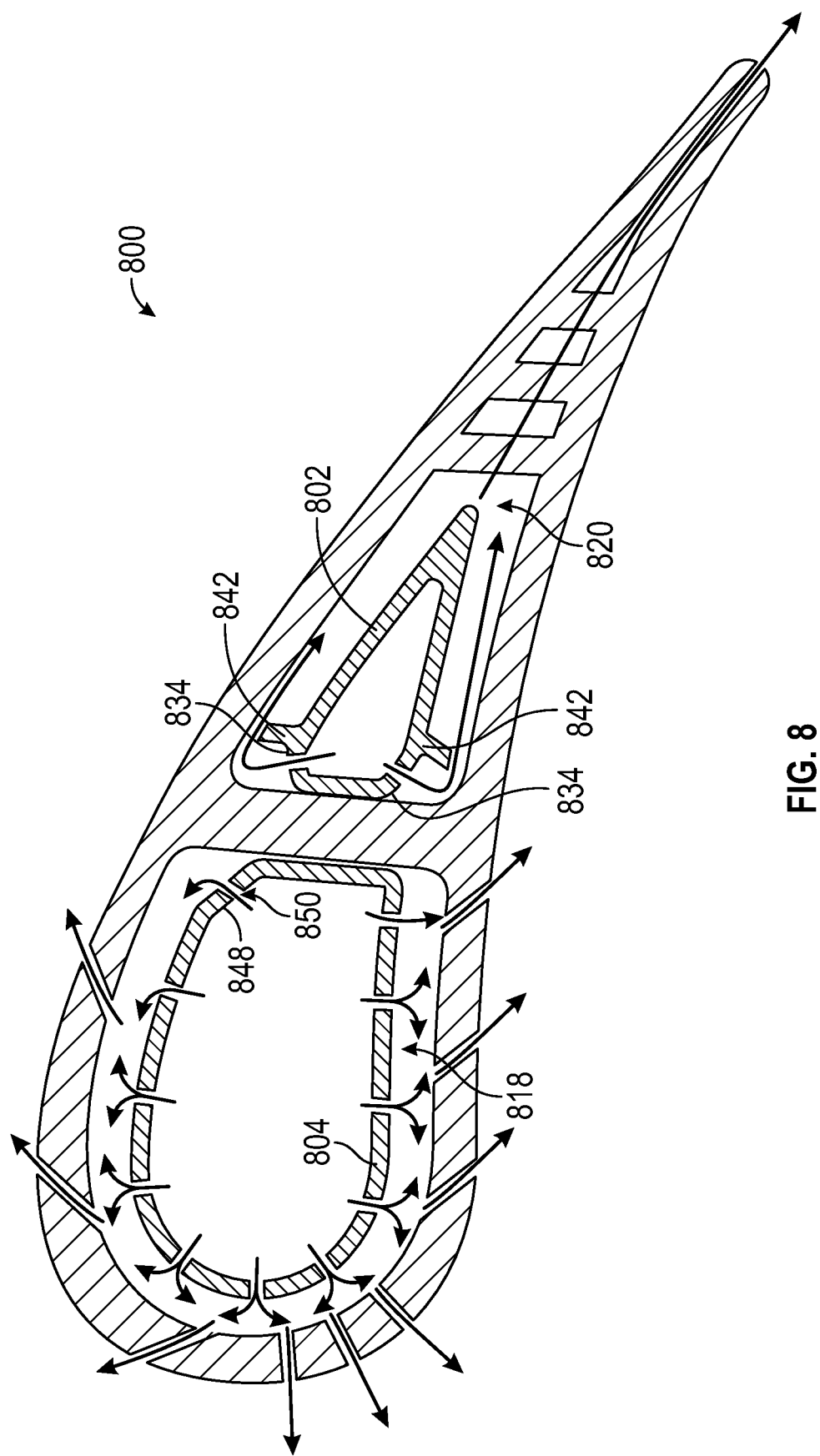
FIG. 8 is a schematic illustration of an airfoil in accordance with an embodiment of the present disclosure.

Turning now to FIG. 8, a schematic illustration of an airfoil 800 having a first baffle 802 and a second baffle 804 installed therein in accordance with an embodiment of the present disclosure is shown. The airfoil 800 may be substantially similar to that shown and described above, and thus like features may not be labeled or described again for clarity and simplicity. In this embodiment, the first baffle 802 is installed within a mid-cavity 820 of the airfoil 800 and the second baffle 804 is installed within a leading edge cavity 818 of the airfoil 800. The first baffle 802 is shown having chamfered surfaces 834 and blocking extensions 842 as shown and described above. Further, the second baffle 804 includes a chamfered surface 848 having baffle holes 850 arranged along the chamfered surface 848 of the second baffle 804. The baffle holes 850 on the chamfered surface 848 of the second baffle 804 are arranged to direct cooling air into an area of low internal heat transfer (i.e., at a junction of a rib and a sidewall of the airfoil 800).

Advantageously, embodiments described herein provide for improved cooling in airfoils having baffles. In accordance with some embodiments, a chamfered surface is formed on the baffle, with the chamfered surface having baffle holes to direct a cooling flow toward and into a region of low internal heat transfer. This cooling flow can thus improve the life of the airfoil by reducing thermal stresses in the regions of low internal heat transfer. Further, advantageously, embodiment provided herein enable supplying cooling flow to regions of airfoils where such cooling flow was previously not able to reach.

Although the various above embodiments are shown as separate illustrations, those of skill in the art will appreciate that the various features can be combined, mix, and matched to form an airfoil having a desired cooling scheme that is enabled by one or more features described herein. Thus, the above described embodiments are not intended to be distinct arrangements and structures of airfoils and/or core structures, but rather are provided as separate embodiments for clarity and ease of explanation.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A component for a gas turbine engine, the component comprising:
   an airfoil having a leading edge, a trailing edge, a suction side, and a pressure side, wherein an airfoil cavity is formed within the airfoil, wherein the airfoil extends from an inner diameter to an outer diameter; and
   a baffle installed within the airfoil cavity, wherein a region of low heat transfer of the airfoil is defined at a forward end of the baffle, the baffle comprising:
   a baffle body having a first end and a second end, wherein the first end is located proximate the inner diameter and the second end is located proximate the outer diameter;
   a chamfered surface formed at at least one corner of the baffle body, wherein the chamfered surface extends from the first end to the second end;
   a plurality of baffle holes formed in the chamfered surface; and
   a blocking extension extending from the baffle body and located proximate the chamfered surface, wherein the blocking extension is configured to direct a portion of a cooling flow from the plurality of baffle holes into the region of low heat transfer.

2. The component of claim 1, wherein the airfoil cavity is a mid-cavity of the airfoil.

3. The component of claim 2, further comprising a leading edge cavity and a trailing edge cavity formed within the airfoil.

4. The component of claim 3, further comprising a second baffle installed within the leading edge cavity.

5. The component of claim 4, wherein the second baffle comprises a chamfered surface formed at at least one corner of the second baffle, wherein the chamfered surface of the second baffle extends from a first end to a second end of the second baffle and a plurality of baffle holes are formed in the chamfered surface of the second baffle.

6. The component of claim 3, wherein the mid-cavity is fluidly connected to the trailing edge cavity.

7. The component of claim 1, wherein the airfoil comprises a rib separating the airfoil cavity from at least one additional airfoil cavity, wherein the region of low heat transfer is defined at a junction between the rib and a sidewall of the airfoil.

8. The component of claim 7, wherein the chamfered surface is positioned adjacent the rib.

9. The component of claim 1, wherein the blocking extension extends from the first end to the second end.

10. The component of claim 1, wherein the blocking extension extends from the baffle body toward a sidewall of the airfoil but does not contact the sidewall and defines a blocking extension gap between the blocking extension and the sidewall.

11. The component of claim 1, wherein the blocking extension comprises a plurality of blocking extension notches.

12. The component of claim 11, wherein the blocking extension contacts a sidewall of the airfoil and the blocking extension notches define flow paths through the blocking extension.

13. The component of claim 1, further comprising a second chamfered surface formed at a different corner of the baffle body, wherein the chamfered surface extends from the first end to the second end, and a plurality of second baffle holes are formed in the second chamfered surface.

14. A gas turbine engine comprising:
an airfoil having a leading edge, a trailing edge, a suction side, and a pressure side, wherein an airfoil cavity is formed within the airfoil, wherein the airfoil extends from an inner diameter to an outer diameter; and
a baffle installed within the airfoil cavity wherein a region of low heat transfer of the airfoil is defined at a forward end of the baffle, the baffle comprising:
a baffle body having a first end and a second end, wherein the first end is located proximate the inner diameter and the second end is located proximate the outer diameter;
a chamfered surface formed at at least one corner of the baffle body, wherein the chamfered surface extends from the first end to the second end;
a plurality of baffle holes formed in the chamfered surface; and
a blocking extension extending from the baffle body and located proximate the chamfered surface, wherein the blocking extension is configured to direct a portion of a cooling flow from the plurality of baffle holes into the region of low heat transfer.

15. The gas turbine engine of claim 14, wherein the airfoil cavity is a mid-cavity of the airfoil.

16. The gas turbine engine of claim 14, wherein the airfoil comprises a rib separating the airfoil cavity from at least one additional airfoil cavity, wherein the region of low heat transfer is defined at a junction between the rib and a sidewall of the airfoil.

17. The gas turbine engine of claim 14, wherein the blocking extension extends from the first end to the second end.

18. The gas turbine engine of claim 14, wherein the blocking extension extends from the baffle body toward a sidewall of the airfoil but does not contact the sidewall and defines a blocking extension gap between the blocking extension and the sidewall.

19. The gas turbine engine of claim 14, wherein the blocking extension comprises a plurality of blocking extension notches.

20. The gas turbine engine of claim 14, further comprising a second chamfered surface formed at a different corner of the baffle body, wherein the chamfered surface extends from the first end to the second end, and a plurality of second baffle holes are formed in the second chamfered surface.

* * * * *